US006392978B1

(12) United States Patent
Sato (10) Patent No.: US 6,392,978 B1
(45) Date of Patent: May 21, 2002

(54) METHOD OF FORMING LIGHT EMITTING PORTION OF LIGHT SPOT FORMING DEVICE AND OPTICAL ELEMENT

(75) Inventor: Akira Sato, Shiga-Ken (JP)

(73) Assignee: Minolta Co., Ltd., Osaka (JP)

( * ) Notice: Subject to any disclaimer, the term of this patent is extended or adjusted under 35 U.S.C. 154(b) by 36 days.

(21) Appl. No.: 09/649,069

(22) Filed: Aug. 29, 2000

(30) Foreign Application Priority Data

Sep. 2, 1999 (JP) .......................................... 11-249044

(51) Int. Cl.[7] ................................................ G11B 7/00
(52) U.S. Cl. ........................ 369/118; 369/120; 369/121; 369/112.23
(58) Field of Search ........................... 369/13.13, 13.17, 369/13.32, 13.33, 13.34, 112.01, 112.23, 112.25, 112.29, 118, 120, 121

(56) References Cited

U.S. PATENT DOCUMENTS

| 5,625,617 | A | | 4/1997 | Hopkins et al. |
| 5,729,393 | A | | 3/1998 | Lee et al. |
| 6,055,220 | A | * | 4/2000 | Mamin et al. ........... 369/13.13 |
| 6,320,708 | B1 | * | 11/2001 | Ueyanagi et al. ........ 369/44.14 |
| 6,324,129 | B1 | * | 11/2001 | Durnin et al. ........... 369/13.17 |
| 6,333,900 | B1 | * | 12/2001 | Maro et al. .............. 369/13.17 |

* cited by examiner

Primary Examiner—Paul W. Huber
(74) Attorney, Agent, or Firm—Morrison & Foerster LLP (57) ABSTRACT

In a method, a light emitting portion of a light spot forming device is formed. The light emitting portion has a minute opening, and a light collecting portion for collecting the light coming from a light source for light spot formation to the minute opening. A light emitting portion base film and a resist film are successively formed on the light collecting portion. A light intercepting mask and a light amount detecting device are arranged. The position of the light intercepting mask is adjusted such that the light from the light source is collected by the light collecting portion onto the base film, and is received by the light amount detecting device, and the amount of light detected by the device takes on the maximum value. The resist film is exposed with the light from a light source for exposure through the through-hole in the mask to form a through-hole for etching. The minute opening is formed by effecting etching on the base film through the through-hole, and thereby the light emitting portion is formed. Then, the resist film is removed.

9 Claims, 5 Drawing Sheets

METHOD OF FORMING LIGHT EMITTING PORTION OF LIGHT SPOT FORMING DEVICE AND OPTICAL ELEMENT

The invention is based on patent application No. 11-249044 Pat. filed in Japan, the contents of which are hereby incorporated by reference.

BACKGROUND OF THE INVENTION

1. Field of the Invention

The present invention relates to a method of forming a light emitting portion of a light spot forming device and an optical element.

2. Description of the Background Art

In an optical memory device for optically recording and reading information, an optical recording medium is used, and a light spot is emitted from a light head to the optical recording medium for recording and reading information so that the information (marks) is recorded on the medium or is read from the medium.

In a field of an optical memory device for optically recording and reading information, it has been demanded to provide a light head which can remarkably increase a capacity of information recorded on the optical recording medium and thus can remarkably increase a record density of information on the optical recording medium because operation speeds of computers have been increased and/or multimedia has been developed. For satisfying the above demand, an optical memory device which is provided with a light spot forming device (light head) using near-field light has been proposed.

In a conventional optical memory device which does not use near-field light, but uses ordinary light, the maximum record density of information depends on diffraction limit of light, and it is impossible to record and read marks substantially shorter than about 300 nm which is substantially equal to the wavelength of light.

In contrast to the above, the optical memory device which has recently been proposed utilizes near-field light and thus a near-field phenomenon of light. In this optical memory device, a minute light spot of a size smaller than the light wavelength is formed, and a distance between the light head and the optical recording medium is reduced to tens of nanometers for information recording and reading. Thereby, small marks of 200 nm or less in size, which exceed the light diffraction limit, can be written (recorded) on the optical recording medium, and can be read therefrom.

The light spot forming device which uses a probe utilizing an optical fiber, a Solid Immersion Lens (SIL) or the like has been proposed as means, which is used for forming a light spot in a light head of an optical memory device using near-field light for writing and reading information. This light spot forming device usually has a light emitting portion which has a light collecting portion utilizing an optical fiber or the like and a minute opening neighboring to it.

In a process of making the light spot forming device, the minute opening is formed in a base member of the light emitting portion. For example, a material which can intercept the light is arranged on the base member of the light emitting portion, and an appropriate light source emits laser light with a high power to the light intercepting material. Thereby, the minute opening is formed.

However, in the process of forming the minute opening in the base member of the light emitting portion of the light spot forming device, the light spot forming device having the light emitting portion, which is provided with the minute opening formed on the end surface of the optical fiber, suffers from such a problem that the position of the minute opening formed in the light emitting portion cannot be accurately coincident with the position of light sent through the fiber from the light source for light spot formation without difficulty. Also, the light spot forming device having the light emitting portion, which is provided with the minute opening in the position of focus of the light collecting portion, suffers from such a problem that the position of the minute opening formed in the light emitting portion cannot be accurately coincident with the position of light collected by the light collecting portion without difficulty.

SUMMARY OF THE INVENTION

An object of the invention is to provide a method of forming a light emitting portion of a light spot forming device, which has the light emitting portion having a minute opening for emitting a light spot, and a light collecting portion neighboring to the light emitting portion for collecting the light coming from a light source for light spot formation to the minute opening, and particularly is to provide the method, in which the position of the light collected by the light collecting portion can be accurately coincident with the position of the minute opening in the light emitting portion, and besides, the light emitting portion can be simply and easily obtained.

Another object of the invention is to provide an optical element which can be used for implementing the method according to the invention.

For achieving the above objects, the inventor has earnestly made a study to find out the followings. In the light spot forming device, the light emitted from the light source for light spot formation is collected by the light collecting portion at a specific position on the base member of the light emitting portion. In this position, the minute opening is formed. In other words, this position can be utilized as the reference for positioning the minute opening to be formed. Thereby, the position where the light is collected by the light collecting portion can be accurately coincident with the position of the minute opening, and the light spot can be efficiently generated.

The invention has been developed based on the foregoing finding, and provides first and second methods of forming a light emitting portion of a light spot forming device as well as an optical element.

(1) First Method of Forming a Light Emitting Portion of a Light Spot Forming Device A method of forming a light emitting portion of a light spot forming device having the light emitting portion having a minute opening for emitting a light spot, and a light collecting portion neighboring to the light emitting portion for collecting the light coming from a light source for light spot formation to the minute opening, including the steps of:

forming a light emitting portion base film, which allows partial passage of the light coming from the light source for light spot formation, in a light collecting region portion, which is to be adjacent to the light emitting portion, of the light collecting portion;

forming on the light emitting portion base film a resist film allowing partial passage of the light coming from the light source for light spot formation, being substantially insensitive to the light coming from the light source and being sensitive to predetermined light for resist exposure;

arranging a light intercepting mask provided with a through-hole and a light amount detecting device in this order in an area opposed to the resist film;

adjusting the position of the light intercepting mask along the resist film such that the light coming from the light source for light spot formation is collected by the light collecting portion onto the light emitting portion base film, and is received by the light amount detecting device through the light emitting portion base film, the resist film and the through-hole in the light intercepting mask, and the amount of light detected by the light amount detecting device takes on the maximum value;

exposing the resist film with the light coming from a light source for resist exposure through the through-hole in the light intercepting mask in the adjusted position;

forming a through-hole for etching by removing an exposed portion of the resist film;

forming the minute opening in the light emitting portion base film to provide the light emitting portion formed of the light emitting portion base film by effecting etching on the light emitting portion base film through the through-hole for etching in the resist film; and removing the resist film.

(2) Second Method of Forming a Light Emitting Portion of a Light Spot Forming Device A method of forming a light emitting portion of a light spot forming device having the light emitting portion having a minute opening for emitting a light spot, and a light collecting portion neighboring to the light emitting portion for collecting the light coming from a light source for light spot formation to the minute opening, including the steps of:

forming a light emitting portion base film, which allows partial passage of the light coming from the light source for light spot formation, in a light collecting region portion, which is to be adjacent to the light emitting portion, of the light collecting portion;

forming on the light emitting portion base film a resist film allowing partial passage of the light coming from the light source for light spot formation, being substantially insensitive to the light coming from the light source and being sensitive to predetermined light for resist exposure;

arranging a projection lens, a half mirror and a light intercepting mask provided with a through-hole in this order in an area opposed to the resist film, arranging a light amount detecting device near the half mirror, and determining a positional relationship between them such that an image of the through-hole in the light intercepting mask is formed by the projection lens on the resist film, and the light coming from the projection lens side and reflected by the half mirror toward the light amount detecting device is collected to the light amount detecting device;

adjusting the position of the light collecting portion such that the light coming from the light source for light spot formation is collected by the light collecting portion onto the light emitting portion base film, and is received by the light amount detecting device through the light emitting portion base film, the resist film, the projection lens and the half mirror, and the light amount detecting device detects the amount of light indicating the fact that an image of the through-hole in the light intercepting mask is formed in the same position on the resist film as the light collected by the light collecting portion;

exposing the resist film with the light coming from a light source for resist exposure through the through-hole in the light intercepting mask, the half mirror and the projection lens;

forming a through-hole for etching by removing an exposed portion of the resist film;

forming the minute opening in the light emitting portion base film to provide the light emitting portion formed of the light emitting portion base film by effecting etching on the light emitting portion base film through the through-hole for etching in the resist film; and removing the resist film.

(3) Optical Element

An optical element including:

a light incoming portion for receiving coming light;

a light emitting portion for emitting the light coming from the light incoming portion;

a reflection film for reflecting and collecting the light coming from the light incoming portion to the light emitting portion; and a light intercepting film having a light transmittance of 0.001% to 10%, and covering the light emitting portion for partially passing therethrough the light emitted from the light emitting portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

According to an example of the invention, a first method of forming a light emitting portion of a light spot forming device having the light emitting portion having a minute opening for emitting a light spot, and a light collecting portion neighboring to the light emitting portion for collecting the light coming from a light source for light spot formation to the minute opening, includes the following steps.

A light emitting portion base film allowing partial passage of the light coming from the light source for light spot formation is formed in a light collecting region portion, which is to be adjacent to the light emitting portion, of the light collecting portion.

A resist film is formed on the light emitting portion base film. The resist film allows partial passage of the light coming from the light source for light spot formation. The resist film is substantially insensitive to the light coming from the light source and is sensitive to predetermined light for resist exposure.

A light intercepting mask provided with a through-hole and a light amount detecting device are arranged in this order in an area opposed to the resist film.

The position of the light intercepting mask is adjusted along the resist film such that the light coming from the light source for light spot formation is collected by the light collecting portion onto the light emitting portion base film, and is received by the light amount detecting device through the light emitting portion base film, the resist film and the through-hole in the light intercepting mask, and the amount of light detected by the light amount detecting device takes on the maximum value.

An exposure is effected on the resist film with the light coming from a light source for resist exposure through the through-hole in the light intercepting mask in the adjusted position.

A through-hole for etching is formed by removing an exposed portion of the resist film.

The minute opening is formed in the light emitting portion base film to provide the light emitting portion formed of the light emitting portion base film by effecting etching on the light emitting portion base film through the through-hole for etching in the resist film.

Finally, the resist film is removed.

According to another example of the invention, a second method of forming a light emitting portion of a light spot forming device having the light emitting portion having a minute opening for emitting a light spot, and a light collecting portion neighboring to the light emitting portion for collecting the light coming from a light source for light spot formation to the minute opening, including the following steps.

A light emitting portion base film allowing partial passage of the light coming from the light source for light spot formation is formed in a light collecting region portion, which is to be adjacent to the light emitting portion, of the light collecting portion.

A resist film is formed on the light emitting portion base film. The resist film allows partial passage of the light coming from the light source for light spot formation. The resist film is substantially insensitive to the light coming from the light source and is sensitive to predetermined light for resist exposure.

A projection lens, a half mirror and a light intercepting mask provided with a through-hole are arranged in this order in an area opposed to the resist film. A light amount detecting device is arranged near the half mirror. A positional relationship between them is determined such that an image of the through-hole in the light intercepting mask is formed by the projection lens on the resist film, and the light coming from the projection lens side and reflected by the half mirror toward the light amount detecting device is collected to the light amount detecting device.

The position of the light collecting portion is adjusted such that the light coming from the light source for light spot formation is collected by the light collecting portion onto the light emitting portion base film, and is received by the light amount detecting device through the light emitting portion base film, the resist film, the projection lens and the half mirror, and the light amount detecting device detects the amount of light indicating the fact that an image of the through-hole in the light intercepting mask can be formed in the same position on the resist film as the light collected by the light collecting portion.

An exposure is effected on the resist film with the light coming from a light source for resist exposure through the through-hole in the light intercepting mask, the half mirror and the projection lens.

A through-hole for etching is formed by removing an exposed portion of the resist film.

The minute opening is formed in the light emitting portion base film to provide the light emitting portion formed of the light emitting portion base film by effecting etching on the light emitting portion base film through the through-hole for etching in the resist film.

Finally, the resist film is removed.

In these methods of forming the light emitting portion of the light spot forming device, formation of the light emitting portion, which has the minute opening for emitting the light spot, is first executed by forming the light emitting portion base film, which allows partial passage of the light coming from the light source for light spot formation, in the light collecting region portion, which is to be adjacent to the light emitting portion, of the light collecting portion for collecting the light coming from the light source for light spot formation to the minute opening. The minute opening is formed in this light emitting portion base film using the following procedure. The light emitting portion base film desirably has the light transmittance from 0.001% to 10%, but not restricted thereto. The transmittance is merely required to allow substantially the detection by the light amount detecting device, which will be described later, of the light which is sent from the light source for light spot formation and is partially passed through the light emitting portion base film. The light source for light spot formation may be red semiconductor laser, He—Ne laser or the like. When using such light source, the light emitting portion base film may be made of aluminum (Al) or chrome (Cr), and may have a thickness from about 50 nm to about 200 nm. The base film described above may be formed, e.g., by a vacuum evaporation coating.

Then, the resist film is formed on the light emitting portion base film. The resist film allows partial passage of the light coming from the light source for light spot formation, is substantially insensitive to the light coming from the light source, and is sensitive to the predetermined light for resist exposure. This resist film will be used as etching resist for effecting etching, which will be described later, to form the minute opening in the light emitting portion base film. If red semiconductor laser, H—Ne laser or the like is used as the light source for light spot formation, the resist film may be made of Novolac positive type resist or the like, and may have a thickness from about 100 nm to about 1000 nm. The film forming method may be a spin coat method or the like.

In the first method of forming the light emitting portion of the light spot forming device, the light intercepting mask provided with the through-hole and the light amount detecting device are disposed in this order in the area opposed to the resist film. This light amount detecting device can be disposed in a fixed position. For example, a light reflecting member which can partially or entirely reflect the light may be disposed between the light intercepting mask and the light amount detecting device, and the light amount detecting device may be disposed to detect the light coming from the light source for light spot formation, partially passed through the light emitting portion base film and the resist film, and reflected by the light reflecting member. The light coming from the light source for light spot formation is collected by the light collecting portion onto the light emitting portion base film, and the light amount detecting device receives and detects the amount of light coming through the light emitting portion base film, the resist film and the through-hole in the light intercepting mask. The position of the light intercepting mask is adjusted and set along the resist film such that the light amount detecting device receives and detects the maximum amount of the light. The light which is emitted from the light source for light spot formation in the above process has a wavelength not causing exposure of the resist film, and therefore the wavelength of the light is shifted from the sensitive wavelength for the resist film. In this manner, the light intercepting mask is positioned with respect to the position where the light coming from the light source for light spot formation is collected by the light collecting portion. Thereby, the resist film is exposed with the light coming from the light source for resist exposure through the through-hole in the light intercepting mask in the adjusted position. Thereby, the position where the light emitted from the light source for light spot formation is collected by the light collecting portion can be used for determining the position of the minute opening formed in the light emitting portion base film.

In the second method of forming the light emitting portion of the light spot forming device, the projection lens, the half mirror and the light intercepting mask provided with the through-hole are disposed in this order in the area opposed to the resist film, and the light amount detecting device is disposed near the half mirror. Further, the positions thereof are set as described below. The image of the through-hole of the light intercepting mask is formed by the projection lens on the resist film, is sent from the projection lens side, is reflected by the half mirror toward the light amount detecting device, and is collected to the light amount detecting device. The light coming from the light source for light spot formation is collected by the light collecting portion onto the light emitting portion base film, is received by the light amount detecting device through the light emitting portion base film, the resist film, the projection lens and the half mirror. The light amount detecting device can detect the light amount indicating that the image of the through-hole in the light intercepting mask is formed on the portion of the resist film where the light is collected by the light collecting portion. The position of the light collecting portion is adjusted and set such that the foregoing state and relationships can be achieved. The light which is emitted from the light source for light spot formation in the above process has a wavelength not causing exposure of the resist film, and therefore the wavelength of the light is shifted from the sensitive wavelength for the resist film. In this manner, the light intercepting mask is positioned with respect to the position where the light coming from the light source for light spot formation is collected by the light collecting portion. Thereby, the resist film is exposed with the light coming from the light source for resist exposure through the through-hole in the light intercepting mask, the half mirror and the projection lens. Thereby, the position where the light emitted from the light source for light spot formation is collected by the light collecting portion can be used for determining the position of the minute opening formed in the light emitting portion base film.

The position of the light source for resist exposure is merely required to allow the through-hole in the light intercepting mask to be projected on the resist film by the projection lens through the light intercepting mask and the half mirror. The half mirror can partially reflect the light coming from the light source for light spot formation to the light amount detecting device, and can partially pass therethrough the light coming from the light source for resist exposure. The half mirror may be a dichroic mirror which can pass the light of a predetermined wavelength, and can reflect the light of a predetermined wavelength.

In any case, the light source for resist exposure may be, e.g., a Hg lamp emitting i-rays (365 nm) if the resist film is made of Novolac positive type resist or the like.

In either of the first and second methods of forming the light emitting portion of the light spot forming device, the exposed portion of the resist film is removed to form the through-hole for etching, and the etching is effected on the light emitting portion base film through the through-hole for etching in the resist film so that the minute opening is formed in the base film. Thereby, the light emitting portion is formed of the light emitting portion base film, and the resist film is removed. In this manner, the light emitting portion of the light spot forming device is formed. Removal of the exposed portion of the resist film can be performed, e.g., by dissolving with alkaline aqueous solution, and the etching of the base film may be dry etching or the like.

In the first and second methods of forming the light emitting portion of the light spot forming device, the position where the light emitted from the light source for light spot formation is collected by the light collecting portion is used for determining the position of the minute opening formed in the light emitting portion base film, and the minute opening is formed in this light collected position. Therefore, the light collected position of the light collecting portion can be accurately coincident with the position of the minute opening in the light emitting portion, and the light spot can be efficiently emitted by the minute opening. Further, the minute opening can be formed in the position which can be accurately and easily determined, and therefore the light emitting portion can be simply and easily obtained.

In the first method of forming the light emitting portion of the light spot forming device, and particularly in the step of disposing the light intercepting mask in the position opposed to the resist film, the light intercepting mask may be in contact with the resist film, or may be spaced by a predetermined distance from the resist film.

In the case where the light intercepting mask is disposed in contact with the resist film, the step of disposing the light amount detecting device may be performed such that the projection lens is disposed for collecting the light passed through the through-hole in the light intercepting mask to the light receiving portion of the light amount detecting device. In this case, the projection lens may be disposed between the light amount detecting device and the light intercepting mask such that the focus position of the projection lens is coincident with the light receiving portion of the light amount detecting device. In this case, the step of adjusting the position of the light intercepting mask can be performed to adjust and set the position of the light intercepting mask along the resist film while keeping the contact between them. In the step of exposing the resist film with the light coming from the light source for resist exposure through the through-hole in the light intercepting mask at the adjusted position, the light source for resist exposure may be disposed in the same position as the light amount detecting device.

In the case where the light intercepting mask is spaced from the resist film by a predetermined distance, the projection lens may be disposed between the resist film and the light intercepting mask, and in the position allowing projection of the through-hole in the light intercepting mask on the resist film. In the step of adjusting and setting the position of the light intercepting mask, the position of the light intercepting mask can be adjusted and set along the resist film while keeping a predetermined space between them. In the step of exposing the resist film with the light coming from the light source for resist exposure through the through-hole in the light intercepting mask at the adjusted position, the light source for resist exposure can be disposed in the same position as the light amount detecting device.

Figure 5:
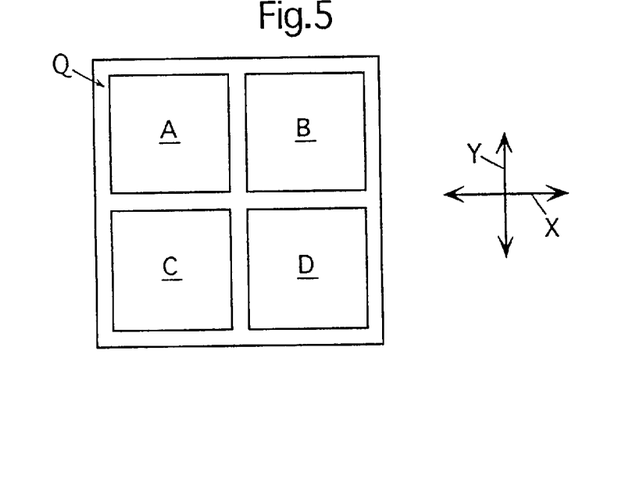
FIG. 5 shows a light amount detection surface of a light amount detection sensor of a 4-division type.

In the second method of forming the light emitting portion of the light spot forming device, and particularly in the step of adjusting and setting the position of the light collecting portion, the light amount indicating the fact that the image of the through-hole in the light intercepting mask is formed on the position of the resist film, where the light is collected by the light collecting portion, may be determined in advance. The light amount detecting device may include a 4-division light amount detection sensor. In this case, the position of the light collecting portion can be rapidly adjusted and set in accordance with the sensor outputs of the 4-division light amount detection sensor. The 4-division light amount detection sensor has a detection surface Q divided into four regions as shown in FIG. 5, and each of regions A, B, C and D can issue a signal when it receives light beams. By calculating the respective signal output values, the detection surface which actually receives the beams can be determined. Assuming that the regions A, B, C and D provide the output values a, b, c and d, respectively, the vertical (Y direction in the figure) position of the beams can be determined from the value of $[(a+b)-(c+d)]$, and the lateral (X direction in the figure) of the beams can be determined from the value of $[(a+c)-(b+d)]$. The position of the light collecting portion is adjusted and set with respect to the positions of the 4-division light amount sensor and the light intercepting mask such that each of the above two difference signals takes on the value of 0. Depending on the output value of the 4-division light amount sensor, it is possible to determine the direction of the required movement. Therefore, the position adjustment of the light collecting portion can be performed accurately within a short time.

An example of the optical element according to the invention includes:

a light incoming portion for receiving coming light;

a light emitting portion for emitting the light coming from the light incoming portion;

a reflection film for reflecting and collecting the light coming from the light incoming portion to the light emitting portion; and a light intercepting film having a light transmittance of 0.001% to 10%, and covering the light emitting portion for partially passing therethrough the light emitted from the light emitting portion.

This optical element can be used for implementing both the first and second methods of forming the light emitting portion of the light spot forming device.

In this optical element, the light intercepting film having the light transmittance of 0.001% to 10% corresponds to the light emitting portion base film in the foregoing methods, and this optical element can be used as the light collecting portion provided with the light emitting portion base film according to the foregoing methods. In this case, preparation of the above optical element corresponds to the step in the foregoing methods of forming the light emitting portion base film for partially passing the light coming from the light source for light spot formation in the light collecting region portion of the light collecting portion to be adjacent to the light emitting portion.

In the foregoing optical element, the light reflection film may have the light transmittance of 0.001% to 10%, and the light reflection film may serve as the light intercepting film. In other words, the light intercepting film may be formed on the whole surface of the optical element except for the light incoming portion. The light intercepting film may serve as the foregoing reflection film. In this case, the light reflectance of the light intercepting film is desirably equal to 90% or more, although not restricted to this.

For example, the light spot forming device, which can be obtained by implementing the method of the invention by using the foregoing optical element, is an SIM (Solid Immersion Mirror) optical element.

In any one of the foregoing cases, the light spot forming device may be employed as a head for forming a near-field light spot, which is used for at least one of the purposes of recording, reproducing and erasing of information on an optical recording medium using near-field light. In the light spot forming device which is employed as the head for the near-field light spot formation, the minute opening provided in the light emitting portion for emitting the light spot is a minute opening for emitting the near-field light.

The light collecting portion which can be employed in the light spot forming device may be an optical fiber connected to the light source for light spot formation, and the light emitting portion base film may be formed on the end surface of the optical fiber. The light collecting portion may also be a combination of the optical fiber connected to the light source for light spot formation and the light collecting mirror which is a concave mirror defined by a body of revolution of an ellipse (spheroid) and formed on the end surface of the optical fiber. In this case, the light emitting portion base film having a high light reflectance may be arranged on the light emitting surface of the light collecting mirror. Thereby, the reflective object mirror (reflection objective mirror) can be formed of the light collecting mirror and the light emitting portion base film. A Solid Immersion Lens (SIL), which can convert the light coming from the light source for light spot formation into the near-field light, and an objective lens which can collect the light coming from the light source for light spot formation to the SIL may be employed as well, in which case the light emitting portion base film may be formed on the light emitting surface of the SIL.

Preferred embodiments of the invention will now be described with reference to the drawings.

Figure 4A:
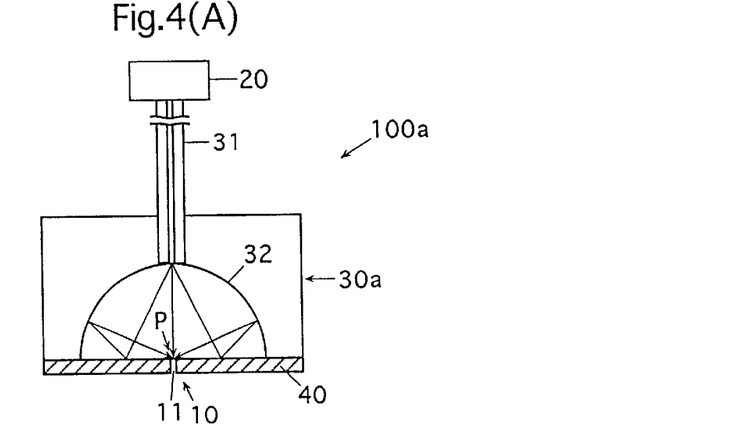
FIG. 4(A) is a side view showing an example of a schematic structure of the light spot forming device which can be obtained by the method of forming the light emitting portion of the light spot forming device according to the invention.
Figure 4B:
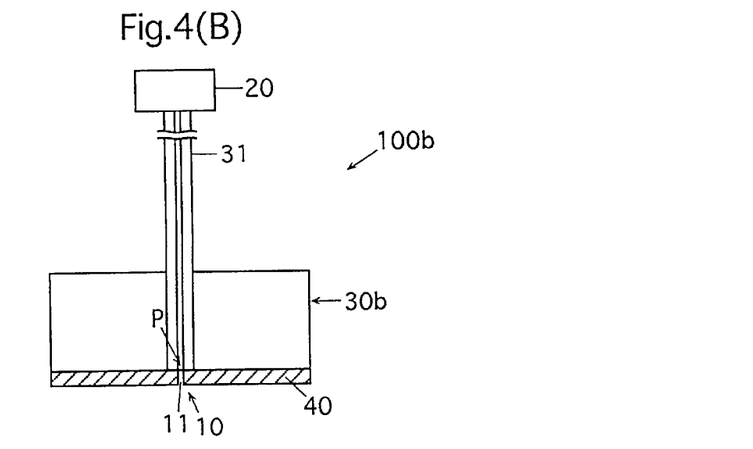
FIG. 4(B) is a side view showing another example of the schematic structure of the light spot forming device which can be obtained by the method of forming the light emitting portion of the light spot forming device according to the invention.
Figure 4C:
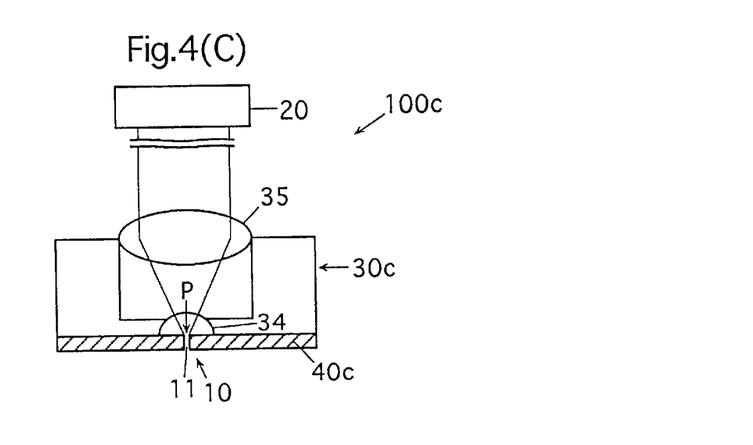
FIG. 4(C) is a side view showing another example of the schematic structure of the light spot forming device which can be obtained by the method of forming the light emitting portion of the light spot forming device according to the invention.

Each of FIGS. 4(A), 4(B) and 4(C) is a side view showing example of schematic structure of a light spot forming device, respectively. Each of them is obtained by utilizing a method of forming a light emitting portion of a light spot forming device according to the invention.

A light spot forming device 100a shown in FIG. 4(A) has a light emitting portion 10 having a minute opening 11 for emitting a light spot, and a light collecting portion 30a which neighbors to the light emitting portion 10 and can collect the light coming from a light source 20 (i.e., laser light source) for light spot formation to the minute opening 11.

The light collecting portion 30a is formed of an optical fiber 31 connected to the light source 20 for light spot formation, and a light collecting mirror 32 which is a concave mirror defined by a body of rotation of an ellipse (spheroid), and is directly connected to an end surface of the optical fiber 31. A light emitting portion base film 40 is formed on the light emission opening surface of the light collecting mirror 32. The light emitting portion base film 40 (i.e., the mirror film which can partially pass the light coming from the light source 20) is partially removed to form the minute opening 11. The light collecting mirror 32 and the mirror film 40 form a reflective object mirror (reflection objective mirror).

A light spot forming device 100b shown in FIG. 4(B) has the light emitting portion 10 having the minute opening 11 for emitting the light spot, and a light collecting portion 30b which neighbors to the light emitting portion 10 and can collect the light coming from the light source 20 (i.e., the laser light source) for light spot formation to the minute opening 11.

The light collecting portion 30b is formed of the optical fiber 31 connected to the light source 20 for light spot formation. The light emitting portion base film 40 is formed on the end surface of the optical fiber 31. The light emitting portion base film 40 (i.e., the mirror film which can partially pass the light coming from the light source 20 therethrough) is partially removed to form the minute opening 11.

A light spot forming device 100c shown in FIG. 4(C) has the light emitting portion 10 having the minute opening 11 for emitting the light spot, and a light collecting portion 30c which neighbors to the light emitting portion 10 and can collect the light coming from the light source 20 (i.e., the laser light source) for light spot formation to the minute opening 11.

The light collecting portion 30c is formed of a Solid Immersion Lens (SIL) 34 which can convert the light coming from the light source 20 for light spot formation into the near-field light, and an object lens 35 which can collect the light coming from the light source 20 for light spot formation to the SIL 34. A light emitting portion base film 40c is formed on the light emission surface of the SIL 34. The light emitting portion base film 40c (i.e., the film which can partially pass the light coming from the light source 20 therethrough) is partially removed to form the minute opening 11.

In the light spot forming device 100a, the light led from the light source 20 for light spot formation to the optical fiber 31 is reflected by the light collecting mirror 32 and the mirror film 40, and thereby is collected at a specific position P on the light emitting portion base film (mirror film) 40. The minute opening 11 is located in this position P. In the light spot forming device 100b, the light led from the light source 20 for light spot formation to the optical fiber 31 is collected at the specific position P on the light emitting portion base film 40. In this position P, the minute opening 11 is formed. In the light spot forming device 100c, the light which is emitted from the light source 20 for light spot formation, and passed through the object lens 35 is collected at the specific position P on the light emitting portion base film 40c, and is converted into the near-field light by the SIL 34. The minute opening 11 for emitting the near-field light is located in this position P.

According to the knowledge of the inventor, by forming the minute openings 11 in the light collected positions P defined by the light collecting portions 30a, 30b and 30c in the light spot forming devices 100a, 100b and 100c, respectively, and in other words, by utilizing the position P for positioning of the minute opening 11, the light collected position P defined by each of the light collecting portions 30a, 30b and 30c can be accurately coincident with the position of the minute opening 11, and the light spot can be efficiently generated.

Examples of the method of forming the light emitting portion of the light spot forming device will now be described with reference to FIGS. 1 to 3.

Figure 1:
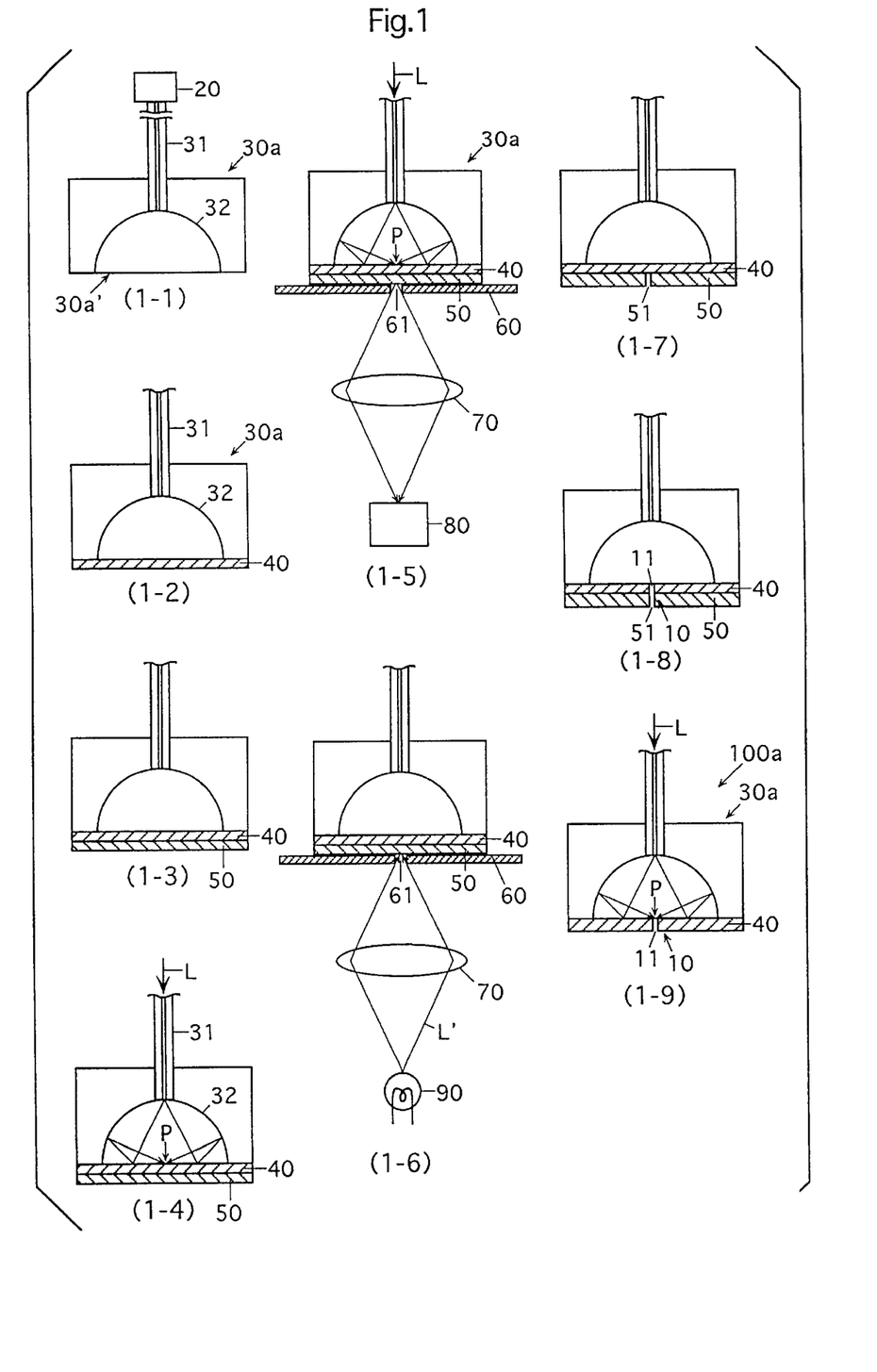
FIG. 1 shows an example of a process of implementing a method of forming a light emitting portion of a light spot forming device shown in FIG. 4(A)

FIG. 1 shows an example of the process for implementing the method of forming the light emitting portion 10 of the light spot forming device 100a shown in FIG. 4(A).

The process shown in FIG. 1 includes steps (1-1) to (1-9). In the step (1-9), the light emitting portion 10 of the light spot forming device 100a can be obtained.

As shown in the steps (1-1) and (1-2) shown in FIG. 1, the light emitting portion base film 40 which can partially pass the light coming from the light source 20 is first formed on a light collecting region portion 30a', which is to be adjacent to the light emitting portion, of the light collecting portion 30a. Then, the minute opening 11 is formed in the light emitting portion base film 40 through the following steps. The light emitting portion base film 40 in this example is a mirror film which is made of aluminum and has a thickness of 50 nm. The light transmittance of this mirror film is desirably in a range from 0.001% to 10%, and is equal to about 0.1% in this example. The light reflectance is desirably equal to 90% or more, and is equal to 92% in this example. The light source 20 for light spot formation is a red semiconductor laser having a wavelength of 630 nm. In the cases which will be described later with reference to FIGS. 2 and 3, the substantially same values or ranges are employed with respect to the light source 20 and film 40.

Then, as shown in a step (1-3), a resist film 50 is formed on the light emitting portion base film 40. This resist film 50 can partially pass the light coming from the light source 20 for light spot formation, is substantially insensitive to the light coming from the light source 20, and is sensitive to predetermined light for resist exposure. This resist film 50 will be used as the etching resist in an etching process, which is performed for forming the minute opening 11 in the light emitting portion base film 40 as will be described later. The resist film 50 is made of Novolac positive type resist, and has a thickness of 200 nm and a sensitive wavelength of 365 nm.

In the above state, the light L is emitted from the light source 20 for light spot formation, is guided through the optical fiber 31 and is collected by the light collecting mirror 32 and the mirror film 40 to the specific position P of the light emitting portion base film 40 (see a step (1-4)).

As shown in a step (1-5), a light intercepting mask 60 provided with a through-hole 61 and a light amount detecting device 80 are disposed in this order in the position opposed to the resist film 50, and the device 80 is located in a fixed position. In this step, the light intercepting mask 60 is disposed in contact with the resist film 50, and a projection lens 70, of which focus position is coincident with the light receiving portion of the device 80, is disposed between the light amount detecting device 80 and the light intercepting mask 60. The light L coming from the light source 20 for light spot formation is collected by the light collecting portion 30a to the light emitting portion base film 40, and is received by the light amount detecting device 80 through the light emitting portion base film 40, the resist film 50 and the through-hole 61 in the light intercepting mask 60. During this operation, the position of the light intercepting mask 60 is adjusted and set along the resist film 50 to maximize the amount of the light detected by the device 80 while keeping the contact between the mask 60 and the resist film 50. The laser light L which is emitted from the light source 20 in the above operation has the wavelength, which does not cause exposure of the resist film 50, and therefore is shifted from the sensitive wavelength for the resist film 50. Thus, the wavelength of the light L provides a low sensitivity with respect to the resist film 50, and is equal to 630 nm in this example. In this manner, The hole 61 of the light intercepting mask 60 is positioned with respect to the light collected position P where the light L coming from the light source 20 for light spot formation is collected by the light collecting portion 30$a$.

In next step (1-6), a light source 90 for resist exposure is disposed in the same position as the light amount detecting device 80, and the resist film 50 is exposed with the light L' (having a wavelength of 365 nm in this example) coming from the light source 90 through the through-hole 61 in the light intercepting mask 60 in the adjusted position. Thereby, the position P where the light L coming from the light source 20 for light spot formation is collected by the light collecting portion 30$a$ can be used for determining the position of the minute opening 11 to be formed in the light emitting portion base film 40.

Then, the exposed portion of the resist film 50 is removed by dissolving with alkaline aqueous solution so that the through-hole 51 for etching is formed (step (1-7)). Then, the etching is effected on the light emitting portion base film 40 through the through-hole 51 for etching in the resist film 50 so that the minute opening 11 is formed in the base film 40, and thereby the light emitting portion base film 40 provides the light emitting portion 10 (step (1-8)). Thereafter, the resist film 50 is removed by dissolving with the alkaline aqueous solution (step (1-9)). In this manner, the light emitting portion 10 of the light spot forming device 100$a$ is formed.

According to the method which employs the process shown in FIG. 1 for forming the light emitting portion 10 in the light spot forming device 100$a$, the position P, where the light L emitted from the light source 20 is collected by the light collecting portion 30$a$, is utilized for determining the position where the minute opening 11 is formed in the light emitting portion base film 40, and the minute opening 11 is formed correspondingly to the light collected position P. Therefore, the light collected position P determined by the light collecting portion 30$a$ can be accurately coincident with the position of the minute opening 11 in the light emitting portion 10, and the minute opening 11 can be used for efficiently issuing the light spot. Further, the position of the minute opening 11 can be accurately and easily determined, and therefore the minute opening 11 can be simply formed so that the light emitting portion 10 can be simply and easily obtained.

Figure 2:
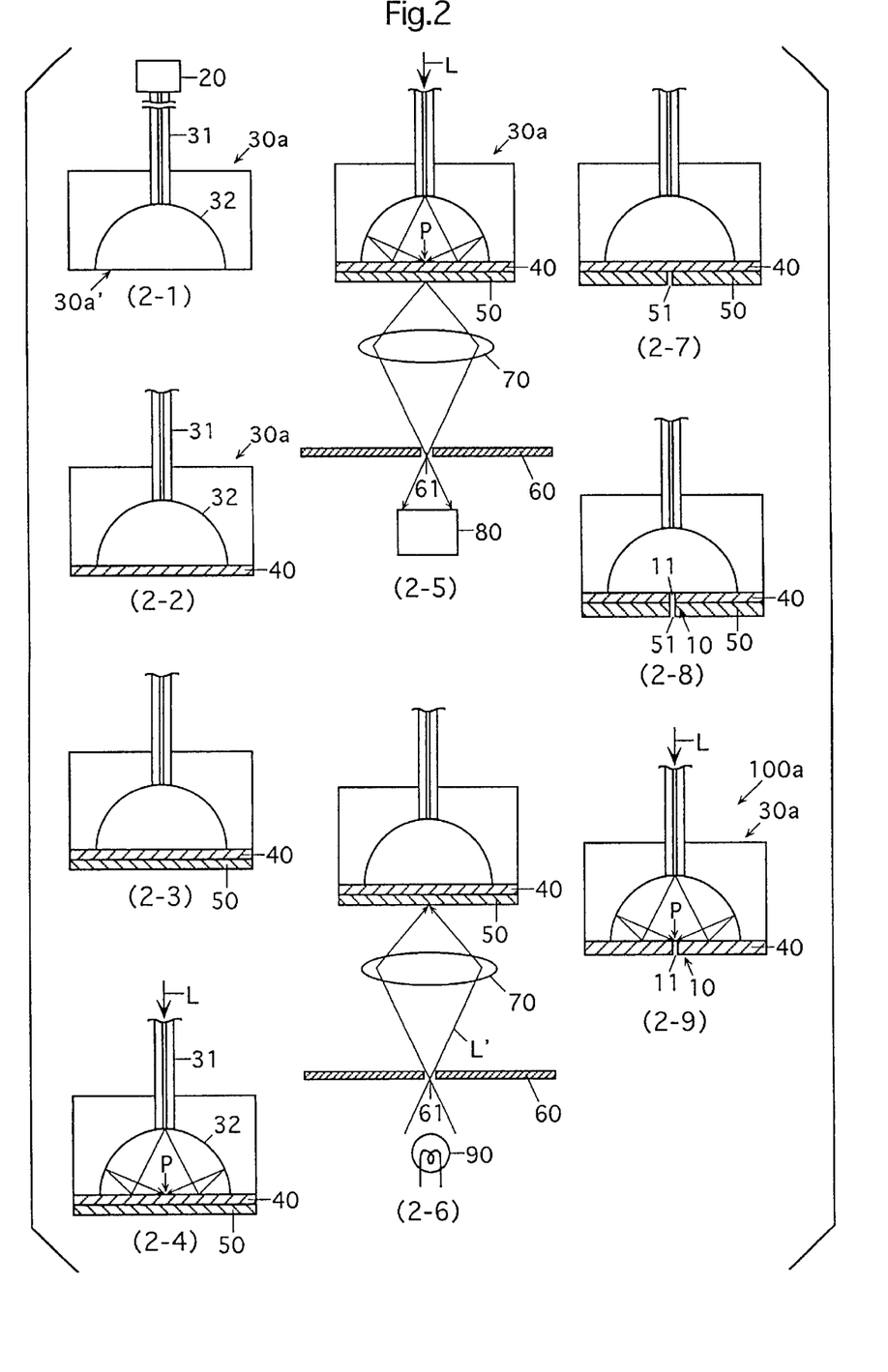
FIG. 2 shows another example of the process of implementing the method of forming the light emitting portion of the light spot forming device shown in FIG. 4(A)

FIG. 2 shows another example of the process for implementing the method of forming the light emitting portion 10 of the light spot forming device 100$a$ shown in FIG. 4(A).

The process shown in FIG. 2 includes steps (2-1)–(2-9), and the light emitting portion 10 of the light spot forming device 100$a$ can be obtained in the step (2-9).

Figure 6:
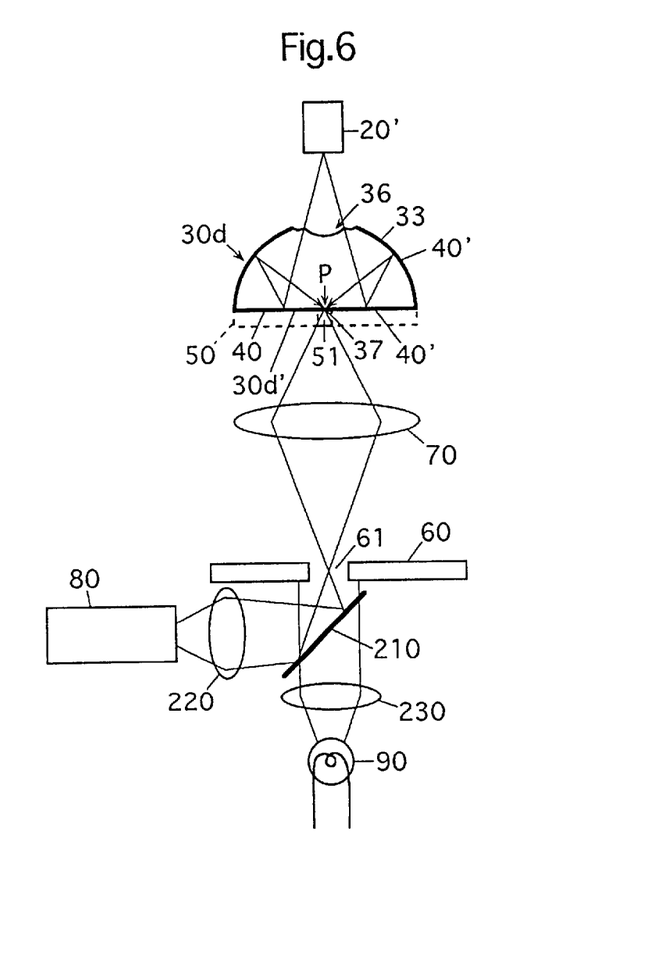
FIG. 6 shows a modification of the process shown in FIG. 2.

The steps (2-1) to (2-4) and (2-7) to (2-9) shown in FIG. 2 are the substantially same as the steps (1-1) to (1-4) and (1-7) to (1-9) shown in FIG. 1, respectively. These steps will not be described in detail, and description will be primarily made on the steps (2-5) and (2-6). In the process shown in FIG. 2 as well as the processes which are shown in FIGS. 6 and 3, and will be described later, the material, the light transmittance and the light reflectance of the light emitting portion base film 40 as well as the material of the resist film 50 and the sensitive wavelength of the resist film 50 are the same as those in the process shown in FIG. 1. The members having the same structures and operations bear the same reference numbers.

As shown in the steps (2-1)–(2-4) shown in FIG. 2, the light emitting portion base film 40 is formed on the light collecting region portion 30$a$' of the light collecting portion 30$a$, and the resist film 50 is formed on the light emitting portion base film 40.

As shown in step (2-5), the light intercepting mask 60 provided with the through-hole 61 and the light amount detecting device 80 are disposed in this order in the position opposed to the resist film 50, and the device 80 is disposed in a fixed position. The light intercepting mask 60 is spaced from the resist film 50 by a predetermined distance, and the projection lens 70 is disposed between the resist film 50 and the light intercepting mask 60, and more specifically in the position where the through-hole 61 in the light intercepting mask 60 can be projected onto the resist film 50. The light intercepting mask 60 is adjusted and set along the resist film 50 such that the light L coming from the light source 20 for light spot formation can be collected by the light collecting portion 30$a$ to the light emitting portion base film 40, and can be received by the light amount detecting device 80 through the light emitting portion base film 40, the resist film 50 and the through-hole 61 in the light intercepting mask 60. More specifically, the position of the light intercepting mask 60 is adjusted and set while keeping a predetermined distance from the resist film 50 so that the light amount detecting device 80 can detect the maximum amount of light. In this manner, the position of the hole 61 of the light intercepting mask 60 is determined with respect to the light collected portion P where the light collecting portion 30$a$ collects the light L coming from the light source 20 for light spot formation.

Then, as shown in step (2-6), the light source 90 for resist exposure is disposed in the same position as the light amount detecting device 80, and the resist film 50 is exposed with the light L' coming from the light source 90 for resist exposure through the through-hole 61 of the light intercepting mask 60 in the adjusted position. Thereby, the position P where the light collecting portion 30$a$ collects the light L emitted from the light source 20 for light spot formation can be used for determining the position where the minute opening 11 of the light emitting portion base film 40 is to be formed.

As shown in the next steps (2-7) to (2-9), the through-hole 51 for etching is formed, and the minute opening 11 is formed in the base film 40, and thereby the light emitting portion base film 40 provides the light emitting portion 10. Also, the resist film 50 is removed. In this manner, the light emitting portion 10 of the light spot forming device 100$a$ is formed.

The method of forming the light emitting portion 10 of the light spot forming device 100$a$ by the process shown in FIG. 2 can achieve the advantages similar to those achieved by the method of forming the light emitting portion 10 of the light spot forming device 100$a$ by the process shown in FIG. 1.

FIG. 6 shows a modification of the process shown in FIG. 2. Referring to FIG. 6, description will now be made on the case of forming the SIM (Solid Immersion Mirror) optical element which is an example of the light spot forming device.

The following description will be made primarily on the difference from the process shown in FIG. 2. In this example, the light source 20 for light spot formation and the optical fiber 31 in the process shown in FIG. 2 are replaced with a light source 20' for light spot formation, the light collecting portion 30a is replaced with a light collecting portion 30d, and a half mirror 210 and lenses 220 and 230 are used.

The light source 20' for light spot formation in this example is formed of a Laser Diode (LD), and can emit light of a wavelength of 410 nm.

The light collecting portion 30d has a form which can be substantially prepared by cutting a body of revolution of an ellipse (spheroid) into a half, and has a flat or plane bottom surface 30d' and a top surface 33 which is defined by an outer curved surface of the body of rotation of the ellipse, and has a top portion defined by a spherical concave surface 36. This concave surface 36 forms the light incoming portion for receiving the light coming from the light source 20'. A light emitting portion 37 for emitting the light coming from the light incoming portion 36 is arranged in the bottom surface 30d'.

For forming the light emitting portion of the light spot forming device, a reflection film 40' made of aluminum is formed over the entire surface of the light collecting portion 30d except for the concave surface (light incoming portion) 36. This reflection film 40' can reflect the light coming from the incoming portion 36, and can collect it on the light emitting portion 37 of the light collecting portion bottom surface 30d'. Further, the light collecting region portion to be adjacent to the light emitting portion of the light collecting portion 30d, i.e., the reflection film 40' formed on the bottom surface 30d' serves as the light emitting portion base film 40 which partially passes the light coming from the light source 20'. The thickness of the aluminum film 40' is equal to about 50 nm, and the reflection film 40' formed on the bottom surface 30d' (i.e., the light emitting portion base film 40) has the light transmittance in a range from 0.001% to 10%.

Similarly to the step (2-3) in FIG. 2, resist film 50 is formed on the reflection film 40' (light emitting portion base film 40) formed on the bottom surface 30d'.

Then, the reduction projection lens 70, the light intercepting mask 60 provided with the through-hole 61 and the light amount detecting device 80 are disposed in this order in the area opposed to the resist film 50. Also, the half mirror 210 and the lenses 220 are disposed between the light intercepting mask 60 and the light amount detecting device 80, and the light amount detecting device 80 is disposed such that the light amount detecting device 80 can detect, through the lens 220, the light, which is emitted from the light source 20' for light spot formation, is partially passed through the light emitting portion base film 40 and the resist film 50, and is reflected by the half mirror 210.

The light coming from the light source 20' for light spot formation is collected by the light collecting portion 30d onto the light emitting portion base film 40, and is received by the light amount detecting device 80 through the light emitting portion base film 40, the resist film 50 and the through-hole 61 in the light intercepting mask 60. While keeping the above state as well as the state where the light intercepting mask 60 is spaced from the resist film 50 by a predetermined distance, the position of the light intercepting mask 60 is adjusted and set along the resist film 50 so that the light amount detecting device 80 detects the maximum amount of light. In this manner, the position of the light intercepting mask 60 is determined with respect to the light collected position P where the light collecting portion 30d collects the light coming from the light source 20' for light spot formation.

Then, the lens 230 is disposed under the half mirror 210, and the light source 90 for resist exposure is disposed under the lens 230. Thereby, the resist film 50 is exposed with the light coming from the light source 90 for resist exposure through the through-hole 61 of the light intercepting mask 60 in the adjusted position. Thereby, the position P where the light collecting portion 30d collects the light emitted from the light source 20' for light spot formation can be used for determining the position where the minute opening of the light emitting portion base film 40 is to be formed. The half mirror 210 can partially reflect the light (having a wavelength of 410 nm in this example) coming from the light source 20' for light spot formation, and can partially pass the light (of a wavelength of 365 nm in this example) coming from the light source 90 for resist exposure.

Similarly to the steps (2-7) to (2-9) in FIG. 2, the through-hole 51 for etching is formed, and the minute opening (i.e., a circular opening of 260 nm in diameter in this example) is formed in the base film 40 so that the light emitting portion base film 40 provides the light emitting portion. Also, the resist film 50 is removed. In this manner, the light emitting portion of the light spot forming device (i.e., the SIM optical element in this example) is formed.

The above process of forming the light emitting portion of the light spot forming device can employ an optical element which includes a light incoming portion for receiving light, a light emitting portion for emitting the light coming from the light incoming portion, a reflecting film for reflecting and collecting the light coming from the light incoming portion to the light emitting portion, and a light intercepting film covering the light emitting portion, allowing partial passage of the light emitted from the light emitting portion and having a light transmittance in a range from 0.001% to 10%. In this optical element, the foregoing reflection film may have a light transmittance in a range from 0.001% to 10%, and may serve also as the light intercepting film. In other words, the light intercepting film may be formed over the entire surface of the optical element except for the light incoming portion. The light intercepting film may serve also as the light reflection film.

In this optical element, if the light reflection film (or the light intercepting film) serves also as the light intercepting film (or the light reflection film), the light incoming portion, the light emitting portion, the light reflection film and the light intercepting film correspond to the light incoming portion 36, the light emitting portion 37, the light reflection film 40' and the light emitting portion base film 40 shown in FIG. 6, respectively, and the element may be used as the light collecting portion 30d provided with the light emitting portion base film 40. In this case, preparation of the above optical element corresponds to the step of forming the reflection film 40' including the light emitting portion base film 40 in the process of forming the light emitting portion of the light spot forming device shown in FIG. 6.

Figure 3:
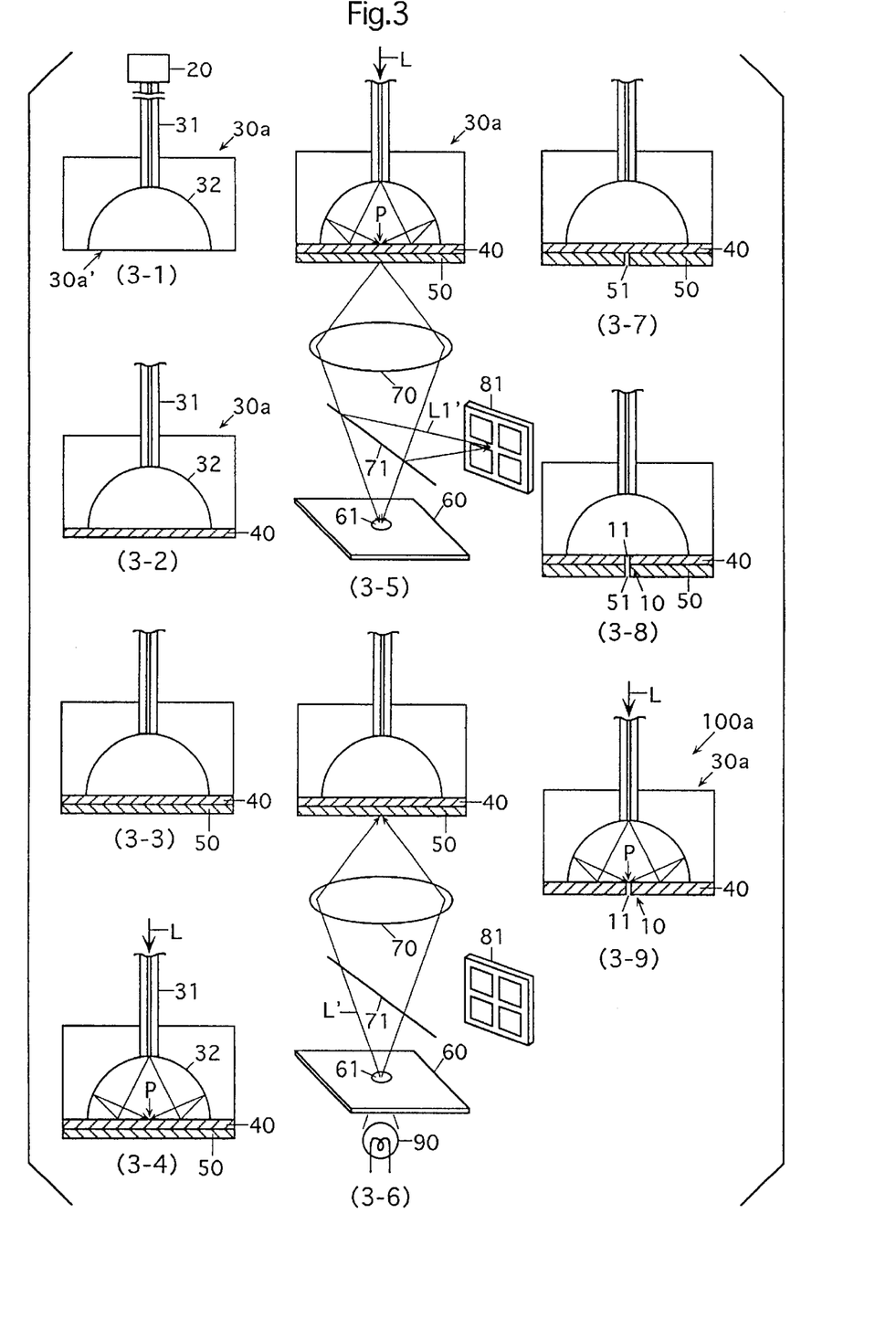
FIG. 3 shows still another example of the process of implementing the method of forming the light emitting portion of the light spot forming device shown in FIG. 4(A)

FIG. 3 shows still another example of the process of implementing the method of forming the light emitting portion 10 of the light spot forming device 100a shown in FIG. 4(A).

The process shown in FIG. 3 is formed of steps (3-1) to (3-9), and the light emitting portion 10 of the light spot forming device 100a can be obtained in the step (3-9).

The steps (3-1) to (3-4) and (3-7) to (3-9) shown in FIG. 3 are similar to the steps (1-1) to (1-4) and (1-7) to (1-9) shown in FIG. 1, respectively, and will not be specifically described below. The following description will be made primarily on the steps (3-5) and (3-6).

As shown in the steps (3-1) to (3-4) shown in FIG. 3, the light emitting portion base film 40 is formed on the light collecting region portion 30a' of the light collecting portion 30a, and the resist film 50 is formed on the light emitting portion base film 40.

Then, as shown in step (3-5), the projection lens 70, a half mirror 71 and the light intercepting mask 60 provided with the through-hole 61 are disposed in this order in the position opposed to the resist film 50, and a light amount detecting device 81 is disposed near the half mirror 71 such that an image of the through-hole in the light intercepting mask 60 is formed on the resist film 50 by the projection lens 70, and the light L1' of the image coming through the projection lens 70 from the film 50 and reflected by the half mirror 71 toward the light amount detecting device, i.e., the 4-division light amount detection sensor 81 is collected on the sensor 81. The light L coming from the light source 20 for light spot formation is collected by the light collecting portion 30a onto the light emitting portion base film 40, and is received by the 4-division light amount detection sensor 81 through the light emitting portion base film 40, the resist film 50, the projection lens 70 and the half mirror 71. Further, the sensor 81 issues a signal indicating that the image of the through-hole 61 in the light intercepting mask 60 is formed on the portion of the resist film 50 where the light collecting portion 30a collects the light. The position of the light collecting portion 30a is adjusted and set so that the foregoing states and relationships can be achieved. The position of the light collecting portion 30a is adjusted by moving it in the direction, which is parallel to the plane perpendicular to the optical axis of the lens 70 and is also parallel to the mask 60. In this manner, the position of the light intercepting mask 60 is determined with respect to the light collected position P, where the light L coming from the light source 20 for light spot formation is collected by the light collecting portion 30a.

As shown in the step (3-6), the light source 90 for resist exposure is disposed in the position, which allows projection of the through-hole 61 in the mask 60 on the resist film 50 by the projection lens 70 through the light intercepting mask 60 and the half mirror 71. Thereby, the resist film 50 is exposed with the light L' coming from the light source 90 through the through-hole 61 in the mask 60, the half mirror 71 and the projection lens 70. Then, the exposed portion of the film 50 is removed. Thereby, the position P, where the light collecting portion 30a collects the light L coming from the light source 20 for light spot formation, can be used for determining the position of the minute opening 11 in the light emitting portion base film 40. The half mirror 71 can partially reflect the light L (having a wavelength of 630 nm in this example) coming from the light source 20 for light spot formation to the light amount detection sensor 81, and can partially pass the light L' (having a wavelength of 365 nm in this example) coming from the light source 90 for resist exposure. The half mirror 71 is a dichroic mirror, which can pass 90% or more of the light having a wavelength not exceeding 500 nm, and can reflect 90% or more of the light having a wavelength larger than 500 nm.

As shown in the steps (3-7) to (3-9), the through-hole 51 for etching is then formed, and the minute opening 11 is formed by etching in the base film 40 so that the light emitting portion base film 40 can provide the light emitting portion 10. Then, the resist film 50 is removed. Thereby, the light emitting portion 10 is formed in the light spot forming device 100a.

The method of forming the light emitting portion 10 of the light spot forming device 100a by the process shown in FIG. 3 can achieve the advantages similar to those by the method of forming the light emitting portion 10 of the light spot forming device 100a by the process shown in FIG. 1.

The description has been made on the method of forming the light emitting portion 10 of the light spot forming device 100a shown in FIG. 4(A). However, similar manners can be employed for forming the light emitting portions 10 of the light spot forming devices 100b and 100c shown in FIG. 4(B) and FIG. 4(C), respectively.

The light spot forming devices 100a and 100b can be used as heads for light spot formation, which are used for at least one of the purposes of recording, reproducing and erasing information on an optical record medium with ordinary light. In the light spot forming devices 100a, 100b and 100c, the minute opening, which is formed in the light emitting portion of the light spot formation head for emitting the light spot, may be a minute opening for emitting near-field light and therefore may have a size smaller than the wavelength of light. Thereby, the devices 100a, 100b and 100c can be used as heads for near-field light spot formation, which are used for at least one of the purposes of recording, reproducing and erasing information on an optical record medium with near-field light.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of forming a light emitting portion of a light spot forming device having the light emitting portion having a minute opening for emitting a light spot, and a light collecting portion neighboring to said light emitting portion for collecting the light coming from a light source for light spot formation to said minute opening, comprising the steps of:

forming a light emitting portion base film allowing partial passage of the light coming from said light source for light spot formation in a light collecting region portion of said light collecting portion to be adjacent to said light emitting portion;

forming on said light emitting portion base film a resist film allowing partial passage of the light coming from said light source for light spot formation, being substantially insensitive to the light coming from said light source and being sensitive to predetermined light for resist exposure;

arranging a light intercepting mask provided with a through-hole and a light amount detecting device in this order in an area opposed to said resist film;

adjusting the position of said light intercepting mask along said resist film such that the light coming from said light source for light spot formation is collected by said light collecting portion onto said light emitting portion base film, and is received by said light amount detecting device through said light emitting portion base film, said resist film and said through-hole in said light intercepting mask, and the amount of light detected by said light amount detecting device takes on the maximum value;

exposing said resist film with the light coming from a light source for resist exposure through the through-hole in said light intercepting mask in the adjusted position;

forming a through-hole for etching by removing an exposed portion of said resist film;

forming said minute opening in said light emitting portion base film to provide the light emitting portion formed of said light emitting portion base film by effecting etching on said light emitting portion base film through the through-hole for etching in said resist film; and removing said resist film.

2. The method of forming the light emitting portion of the light spot forming device according to claim 1, wherein said light intercepting mask is kept in contact with said resist film in said step of arranging said light intercepting mask in the area opposed to said resist film.

3. The method of forming the light emitting portion of the light spot forming device according to claim 1, wherein a projection lens for collecting the light passed through the through-hole in said light intercepting mask to the light collecting portion of said light amount detecting device is arranged in said step of arranging said light amount detecting device.

4. The method of forming the light emitting portion of the light spot forming device according to claim 1, wherein said light intercepting mask is spaced by a predetermined distance from said resist film in said step of arranging said light intercepting mask in the area opposed to said resist film.

5. The method of forming the light emitting portion of the light spot forming device according to claim 4, wherein a projection lens is disposed between said resist film and said light intercepting mask, and in a position allowing projection of the through-hole in said light intercepting mask onto said resist film.

6. A method of forming a light emitting portion of a light spot forming device having the light emitting portion having a minute opening for emitting a light spot, and a light collecting portion neighboring to said light emitting portion for collecting the light coming from a light source for light spot formation to said minute opening, comprising the steps of:

forming a light emitting portion base film allowing partial passage of the light coming from said light source for light spot formation in a light collecting region portion of said light collecting portion to be adjacent to said light emitting portion;

forming on said light emitting portion base film a resist film allowing partial passage of the light coming from said light source for light spot formation, being substantially insensitive to the light coming from said light source and being sensitive to predetermined light for resist exposure;

arranging a projection lens, a half mirror and a light intercepting mask provided with a through-hole in this order in an area opposed to said resist film, arranging a light amount detecting device near said half mirror, and determining a positional relationship between them such that an image of the through-hole in said light intercepting mask is formed by said projection lens on said resist film, and the light coming from the projection lens side and reflected by said half mirror toward said light amount detecting device is collected to said light amount detecting device;

adjusting the position of said light collecting portion such that the light coming from said light source for light spot formation is collected by said light collecting portion onto said light emitting portion base film, and is received by said light amount detecting device through said light emitting portion base film, said resist film, said projection lens and said half mirror, and the light amount detecting device detects the amount of light indicating the fact that an image of the through-hole in said light intercepting mask is formed in the same position on said resist film as the light collected by said light collecting portion;

exposing said resist film with the light coming from a light source for resist exposure through the through-hole in said light intercepting mask, said half mirror and said projection lens;

forming a through-hole for etching by removing an exposed portion of said resist film;

forming said minute opening in said light emitting portion base film to provide the light emitting portion formed of said light emitting portion base film by effecting etching on said light emitting portion base film through the through-hole for etching in said resist film; and removing said resist film.

7. The method of forming the light emitting portion of the light spot forming device according to claim 6, wherein said light amount detecting device includes a 4-division light amount detection sensor.

8. An optical element comprising:

a light incoming portion for receiving coming light;

a light emitting portion for emitting the light coming from said light incoming portion;

a reflection film for reflecting and collecting the light coming from said light incoming portion to said light emitting portion; and a light intercepting film having a light transmittance of 0.001% to 10%, and covering said light emitting portion for partially passing therethrough the light emitted from said light emitting portion.

9. The optical element according to claim 8, wherein said light intercepting film is formed on the whole surface of the optical element except for said light incoming portion, and serves as said reflection film.

* * * * *